(12) United States Patent
Nishi

(10) Patent No.: US 8,565,291 B2
(45) Date of Patent: Oct. 22, 2013

(54) COMMUNICATION APPARATUS, DATA COMMUNICATION METHOD, AND STORAGE MEDIUM STORING DATA COMMUNICATION PROGRAM

(75) Inventor: Hirofumi Nishi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 216 days.

(21) Appl. No.: 13/167,033

(22) Filed: Jun. 23, 2011

(65) Prior Publication Data

US 2011/0317788 A1 Dec. 29, 2011

(30) Foreign Application Priority Data

Jun. 25, 2010 (JP) ................................. 2010-145224

(51) Int. Cl.
*H04L 5/16* (2006.01)
(52) U.S. Cl.
USPC ........... 375/222; 375/219; 375/257; 375/260; 375/262; 375/265; 375/267; 375/295; 375/298; 375/316
(58) Field of Classification Search
USPC .......... 375/222, 260, 262, 267, 295, 296, 298
See application file for complete search history.

(56) References Cited

U.S. PATENT DOCUMENTS 6,574,280 B1 * 6/2003 Liau et al. ..................... 375/242
6,757,325 B1 * 6/2004 Abdelilah et al. ............ 375/222

FOREIGN PATENT DOCUMENTS

JP 3639705 1/2005
JP 2009-135612 6/2009

* cited by examiner

*Primary Examiner* — Dhaval Patel
(74) *Attorney, Agent, or Firm* — Cooper & Dunham LLP

(57) ABSTRACT

A communication apparatus for executing half-duplex data communication conforming to V.34 recommendation including, a modulation-demodulation device modulating and demodulating data; a control device determining that the communication procedure shift to a recovery procedure by receiving an $INFO_{0a}$ transmitted from an answering-communication apparatus again when the communication apparatus mistakenly detects a Tone A subsequently to the $INFO_{0a}$ for a Tone $\overline{A}$ or the answering-communication apparatus cannot receive an initial $INFO_{0c}$ transmitted from the communication apparatus correctly, the control device commanding the modulation-demodulation device to stop the recovery procedure when the communication apparatus receives the $INFO_{0a}$ while waiting to receive an $INFO_h$ even without receiving the $INFO_h$ from the answering-communication apparatus in the recovery procedure; and a CODEC/DAA receiving the command and causing the communication procedure to return to a predetermined state in Phase 2 based on the command from the control device after the recovery procedure is stopped.

8 Claims, 4 Drawing Sheets

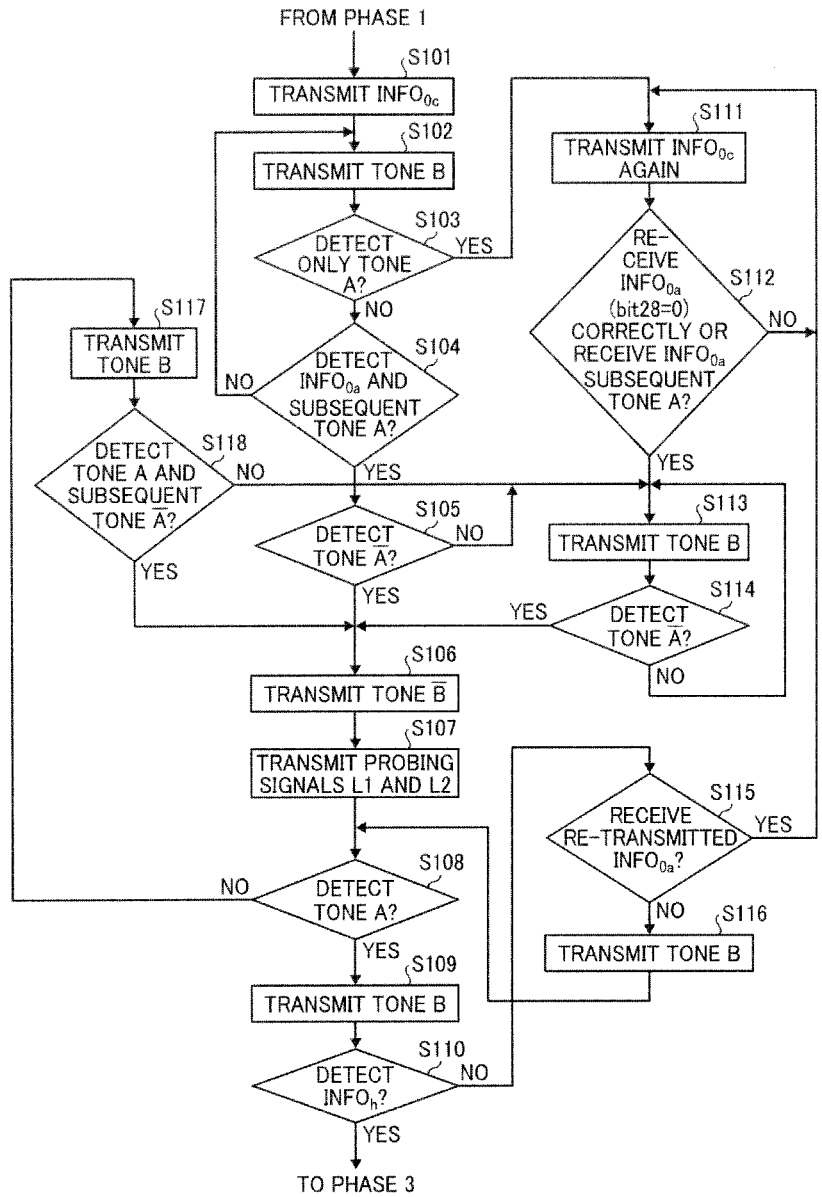

COMMUNICATION APPARATUS, DATA COMMUNICATION METHOD, AND STORAGE MEDIUM STORING DATA COMMUNICATION PROGRAM

BACKGROUND

1. Technical Field

The present disclosure relates to a communication apparatus, a method for data communication, and a recording medium storing a data communication program.

2. Description of the Background Art

Transmission procedures for facsimiles are defined by ITU (International Telecommunication Union) recommendation T.30 (Procedures for document facsimile transmission in the general switched telephone network). V.34, a fast (up to 33.6 kbp/s) MODEM recommendation (ISU-series) is established in 1994, and a transmission procedure for facsimile conforming to V.34 is defined in Annex F of T.30.

According to T.30, when the Recommendation V.34 is used for facsimile transmission, an error-correcting procedure is deemed essential and is defined in Recommendation T.4. In V.34-standard half-duplex facsimile communication, communication interaction is performed in Phase 1, channel (line) probing is performed in Phase 2, and Equalizer training is performed in Phase 3. More specifically, in Phase 1, the communication standard is defined. In Phase 2, symbol rate, carrier frequency, and pre-emphasis filter are defined. In Phase 3, equalizer is trained by primary channel training, and signal speed of the primary channel is defined at a reception side based on the training result. Then, the control channel and primary channel are alternately repeated.

The control channel includes control data relating to transmitted and received data, for example, image-related data (e.g., line density), signal speed, and whether or not the image has been properly received. The primary channel includes an S signal for re-synchronization, phase reversal signal Sbar, equalizer training signal PP, binary signal B1, and image data. A data format of the image data when the error-correcting procedure is used is defined in Recommendation T.4. The image data includes frames composed of 256 octets or 64 octets, and a maximum of 256 frames can be transmitted by the primary channel at one time.

In Phase 2, an $INFO_{0c}$ sequence signal and an $INFO_{0a}$ sequence signal are exchanged between a call MODEM at the transmission side and an answer MODEM at the reception side. The transmission side transmits a Tone B, and the reception side transmits a Tone A and a Tone $\overline{A}$ (Tone A phase reversal). After 40 m sec has elapsed, the transmission side transmits a Tone $\overline{B}$ (Tone B phase reversal) and line probing signals (probing Tones) L1 and L2 followed by a second Tone B in response to a second Tone A and an $INFO_h$ sequence signal from the reception side. Thus, the line characteristics that determine image data communication speed can be measured.

One example of the recovery procedure in Phase 2 is proposed in JP-H11-150580-A. In this example, when a call MODEM does not receive second Tone A from an answer MODEM, or the answer MODEM does not receive the second Tone B from the call MODEM, within a predetermined period (two seconds) normally, and furthermore the Tone B or the Tone A is detected within a certain period of time, the communication procedure conforming to the V.34 recommendation retunes to Phase 2.

As described above, the data communication procedure using telephone lines is defined by the ITU, and the MODEM that operates at a data signal speed of up to 33.6 kbps is defined in the V.34 recommendation. In addition, in the V.34 recommendation, training for Phase 1 to Phase 4 is executed as for preparing data communication. In the half-duplex operation of Phase 2, both call MODEM and answer MODEM exchange MODEM capabilities (the supported symbol rate, carrier frequency, and whether or not there is a power protection capability) through $INFO_{0c}/INFO_{0a}$. Then, both call MODEM and answer MODEM analyze line conditions by line probing (L1/L2), select symbol rate, carrier frequency, and reemphasis coefficient, and the answer MODEM transmits the result to the call MODEM as the $INFO_h$ signal again. It should be noted that all INFO sequences ($INFO_{0a}$, $INFO_{0c}$, and $INFO_h$) are transmitted by using binary differential phase shift keying (DPSK) at 600 bps.

Herein, because the $INFO_{0c}/INFO_{0a}$ signal is transmitted from the top of Phase 2, when the line is severely deteriorated, the INFO sequences cannot be received correctly, which is a problem. In addition, in communication using an internet protocol (IP) network, due to problems such as packet loss, the reception data may be missed, which is also a problem.

The above-described example procedure proposes the recovery procedure not for detection of the $INFO_{0c}$ and the $INFO_{0a}$ but for Tone detection, and therefore cannot solve the above-described problems corresponding to the $INFO_{0c}$ and the $INFO_{0a}$.

In the V.34 recommendation, in anticipation of these problems, a recovery procedure is defined: When the $INFO_{0c}/INFO_{0a}$ sequences cannot be received, they are transmitted again. However, when the INFO sequence is transmitted again in the recovery procedure, communication is stopped (error/end) because the procedure cannot proceed to the next step.

SUMMARY

In an aspect of this disclosure, there is a provided a communication apparatus for executing half-duplex data communication conforming to V.34 recommendation, transmitting an $INFO_{0c}$ sequence signal, and communicating with an answering communication apparatus that transmits an $INFO_{0a}$ sequence signal, a Tone A signal, a Tone A phase reversal signal, and an $INFO_h$ sequence signal. The communication apparatus includes a modulation-demodulation device, a control device, and a CODEC/DAA. The modulation-demodulation device modulates and demodulates data conforming to V.34 recommendation. The control device determines that the communication procedure shift to a recovery procedure by receiving the $INFO_{0a}$ sequence signal transmitted from the answering communication apparatus again in a state in which the communication apparatus mistakenly detects the Tone A signal subsequently to the $INFO_{0a}$ sequence signal for the Tone A phase reversal signal or the answering communication apparatus then cannot receive an initial $INFO_{0c}$ sequence signal transmitted from the communication apparatus correctly. Then, the control device commands the modulation-demodulation device to stop the recovery procedure when the communication apparatus receives the $INFO_{0a}$ sequence signal while waiting to receive the $INFO_h$ sequence signal even without receiving the $INFO_h$ sequence signal from the answering communication apparatus in the recovery procedure. The CODEC/DAA receives the command from the control device through the modulation-demodulation device and causes the communication procedure conforming to V.34 recommendation to return to a predetermined state in Phase 2 based on the command from the control device after the recovery procedure is stopped.

In another aspect, there is provided a control method for executing half-duplex data communication conforming to V.34 recommendation in the communication apparatus as described above. The control method including the steps of, when the communication apparatus mistakenly detects the Tone A signal subsequently to the $INFO_{0a}$ sequence signal for the Tone A phase reversal signal and the answering communication apparatus then cannot receive an initial $INFO_{0c}$ sequence signal transmitted from the communication apparatus correctly, determining that the communication procedure shifts to a recovery procedure by receiving the $INFO_{0a}$ sequence signal transmitted from the answering communication apparatus; stopping the recovery procedure when the communication apparatus receives the $INFO_{0a}$ sequence signal while waiting to receive the $INFO_h$ sequence signal even without receiving the $INFO_h$ sequence signal from the answering communication apparatus in the recovery procedure; and returning the communication procedure conforming to V.34 recommendation to a predetermined state in Phase 2.

In another aspect, there is provided a storage medium to store a data communication program for executing the control method as described above.

BRIEF DESCRIPTION OF THE DRAWINGS

A more complete appreciation of the aforementioned and other features, aspects and advantages will bet better understood by reference to the following detailed description when considered in connection with the accompanying drawings, wherein:

FIG. 4 is a flowchart illustrating a Phase 2 operation procedure including a recovery procedure in the call MODEM shown in FIG. 1.

DETAILED DESCRIPTION OF PREFERRED EMBODIMENTS

Figure 1:
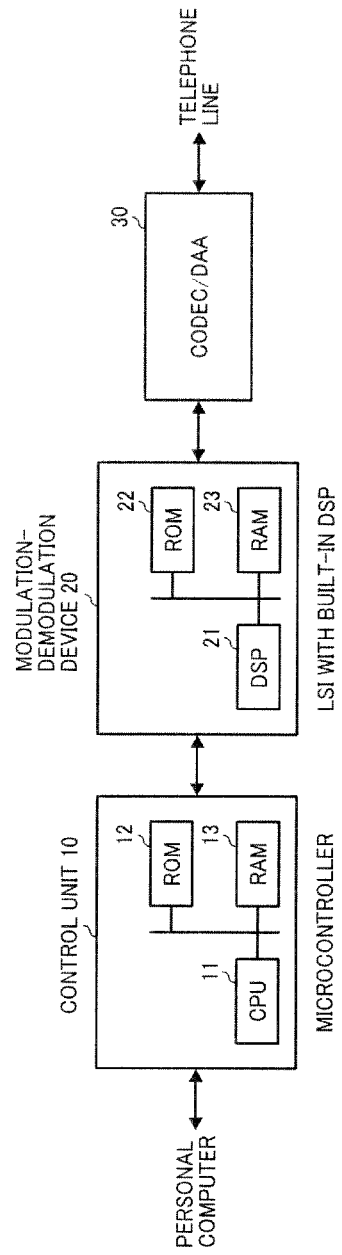
FIG. 1 illustrates a configuration of a call MODEM according to an embodiment of the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, particularly to FIG. 1, a MODEM according to an illustrative embodiment is described.

(Modem Configuration)

FIG. 1 illustrates a configuration of a MODEM according to a present embodiment. The MODEM of the present embodiment is a call MODEM that executes data communication procedure in half-duplex (HDX) conforming to V.34 recommendation. The call MODEM communicates with an answer MODEM. In FIG. 1, the call MODEM includes a modulation-demodulation device 20, a control unit 10, and a CODEC/DAA (coder/decoder)/(Direct Access Arrangement) 30. The call MODEM serves as a communication apparatus, and the answer MODEM serves as an answering communication apparatus. The modulation-demodulation device 20 performs modulation and demodulation conforming to the V.34 recommendation. When the call MODEM mistakenly detects a Tone A signal (hereinafter also just "Tone A") subsequently to an $INFO_{0a}$ sequence signal (hereinafter also just "$INFO_{0a}$") for a phase-reversal Tone A signal (hereinafter also just "Tone $\overline{A}$"), or when the answer MODEM cannot correctly receive an initial $INFO_{0c}$ sequence signal (hereinafter also "$INFO_{0c}$"), the control unit 10 determines that the communication procedure has proceeded to a recovery procedure by receiving the $INFO_{0a}$ sequence signal transmitted from the answer MODEM again. Thus, the control unit 10 commands the modulation-demodulation device 20 to stop the recovery procedure when the call MODEM receives the $INFO_{0a}$ sequence signal while waiting to receive a $INFO_h$ sequence signal (hereinafter also "$INFO_h$") even without receiving the $INFO_h$ sequence signal from the answer MODEM in the recovery procedure. After the recovery procedure is stopped, the CODEC/DAA 30 causes the communication procedure conforming to V.34 recommendation to return to a predetermined state in Phase 2 based on the command from the control unit 10.

More specifically, in FIG. 1, the control unit 10 interprets the command from a host (personal computer), commands the modulation-demodulation device 20 to perform MODEM operation (e.g., a dialing command and a response-start command), exchanges the transmission data and the reception data by communicating the host (personal computer) and the MODEM, compresses and expands the data, and corrects error.

It is preferable that the control unit 10 be formed by a microcontroller because the control unit 10 needs to perform situation judgment and bitwise operation on the data many times. The control unit 10 includes a central processing unit (CPU) 11, a read only memory (ROM) 12, and a random access memory (RAM) 13. The above-described proceedings are stored in the ROM 12 in the control unit 10 as program including data communication program and are executed by the CPU 11. The RAM 13 stores various data to be used in the control unit 10. Herein, the ROM12 and RAM 13 serves as associated memory devices that store and execute a program to gauge the state of the communication procedure in the call MODEM, determine which signal is being received from the answer MODEM, and direct when and how the communication procedure should shift.

The modulation-demodulation device 20 interprets the command from the control unit 10 and performs the modulation and the demodulation conforming to the V.34 recommendation. More specifically, the modulation-demodulation device 20 modulates transmission data to a predetermined data at a sample point that is input to a D/A converter in the CODEC/DAA 30 to transmit the CODEC/DAA 30, the modulated predetermined data is converted to analog signal in the D/A converter in the CODEC/DAA 30, and the analog signal is transmitted to a telephone line. While, a signal input from the telephone line is converted from analog to digital (A/D) in the CODEC/DAA 30, the converted digital data is input to the modulation-demodulation device 20, and the modulation-demodulation device 20 demodulates the digital data to the reception data.

The modulation-demodulation device 20 includes a digital signal processor (DSP) 21, a ROM 22, and a RAM 23. It is common to adapt a DSP in the modulation-demodulation device 20 because the modulation-demodulation device needs complicated digital signal processing. A sequence control program for the respective Phases in the MODEM and modulation-demodulation program are stored in the ROM 22, and the programs are executed by the DSP 21. The RAM 23 stores the data to be used for executing in the DSP 21. Since the analog signal flows through the telephone line, the CODEC/DAA 30 includes a CODEC (including the A/D converter and the D/A converter) that converts from analog to digital (A/D) and from digital to analog (D/A) and a DAA that is an interface to the telephone line.

(Rules of the V.34 recommendation)

Figure 2:
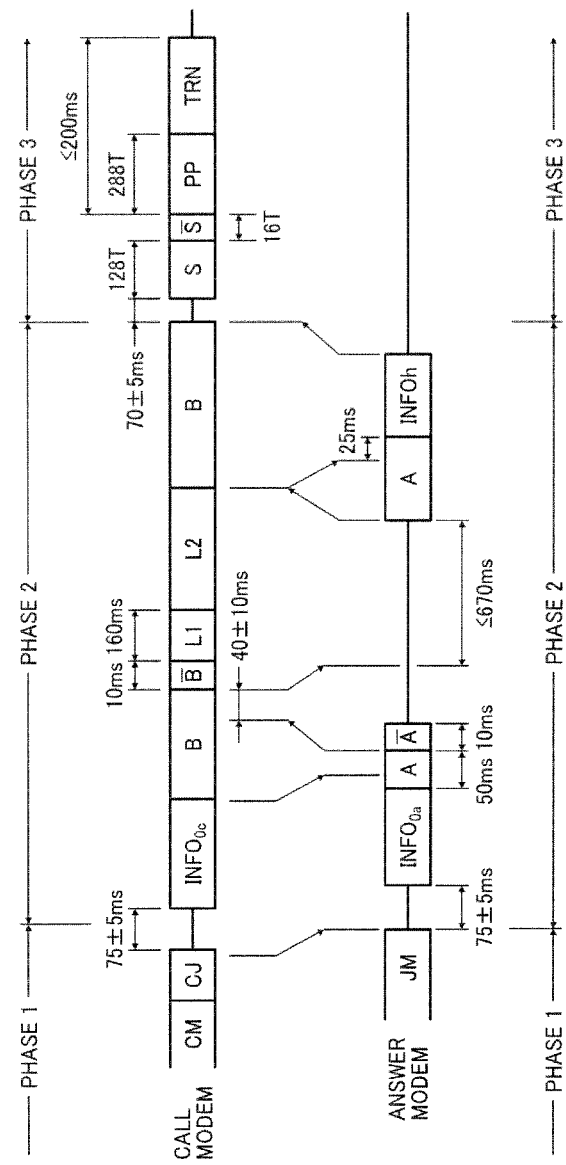
FIG. 2 is a typical communication sequence chart established by the V.34 recommendation.

FIG. 2 is a typical communication sequence chart established by the V.34 recommendation. Initially, in Phase 1, the call MODEM transmits a calling Tone CNG (not shown) to the answer MODEM, and the answer MODEM transmits an answer Tone ANsam back to the call MODEM in response to the calling Tone CNG. Then, the call MODEM transmits a calling menu signal CM, and the answer MODEM transmits joint menu signal JM back to the call MODEM in response to the calling menu signal CM. Thus, the available modulation mode becomes selectable in the call MODEM side and the answer MODEM side.

Below describes the rules of the V.34 recommendation about transmission signals and reception signals of the half-duplex MODEM in Phase 2 of the communication procedure.

(12.2.1.1) Call MODEM error-free operation (12.2.1.1.1) During the 75±5 ms silent period ending Phase 1, the call MODEM conditions its receiver to receive the $INFO_{0a}$ and detects the Tone A. After the 75±5 ms silent period, the call MODEM sends the $INFO_{0c}$ with bit 28 set to 0, followed by a Tone B signal (hereinafter also "Tone B").

(12.2.1.1.2) After receiving the $INFO_{0a}$, the call MODEM sets the receiver to detect the Tone A and the subsequent Tone $\overline{A}$ (Tone A phase reversal).

(12.2.1.1.3) After detecting the Tone $\overline{A}$, the call MODEM waits 40±10 ms and transmits a Tone B phase reversal (hereinafter just "Tone $\overline{B}$").

The Tone $\overline{B}$ is transmitted for another 10 ms after phase reversal and the call MODEM transmits a probing signal L1 for 160 ms. Subsequently, the call MODEM transmits a probing signal L2 and conditions its receiver to detect the Tone A.

(12.2.1.1.4) After detecting the Tone A, the call MODEM transmits the Tone B and conditions its receiver to receive the $INFO_h$. After receiving the $INFO_h$, the call MODEM proceeds to Phase 3 procedure according to operation (12.3.1).

(12.2.1.2) Answer modem error-free operation (12.2.1.2.1) During the 75±5 ms silent period ending Phase 1, the answer MODEM conditions its receiver to receive the $INFO_{0c}$ and detects the Tone B. After the 75±5 ms silent period, the answer MODEM sends the $INFO_{0a}$ with bit 28 set to 0, followed by the Tone A.

(12.2.1.2.2) After receiving the $INFO_{0c}$, the answer MODEM conditions its receiver to detect the Tone B and receive the $INFO_{0c}$.

(12.2.1.2.3) After the Tone B is detected and the Tone A has been transmitted for at least 50 ms, the answer MODEM transmits Tone A phase reversal (Tone $\overline{A}$). The Tone $\overline{A}$ is transmitted for another 10 ms after the phase reversal, that is, the Tone $\overline{A}$ is has been transmitted for 10 ms, and then the answer MODEM transmits silence. Then, the answer MODEM conditions its receiver and to detect the Tone B phase reversal (Tone $\overline{B}$).

(12.2.1.2.4) After detecting Tone $\overline{B}$, the answer MODEM is conditioned to receive the probing signals L1 and L2.

(12.2.1.2.5) The answer MODEM receives the probing signal L1 for its 160 ms duration. Subsequently, the answer MODEM may receive the probing signal L2 for a period of time not to exceed 500 ms. Then, the answer MODEM transmits the Tone A and conditions its receiver to detect the Tone B.

(12.2.1.2.6) After the Tone B is detected, the answer MODEM continues transmitting the Tone A for 25 ms, and then sends the $INFO_h$. After sending the $INFO_h$, the answer MODEM proceeds to Phase 3 procedure according to operation (12.3.2)

(12.2.1.3) Call modem recovery mechanism (12.2.1.3.1) If, in 12.2.1.1.2 or 12.2.1.1.3, the Tone A is detected before correctly receiving the $INFO_{0a}$, or the repeated $INFO_{0a}$ is received, the call MODEM repeatedly sends the $INFO_{0c}$. If the call MODEM receives the $INFO_{0a}$ with bit 28 set to 1, it conditions itself to detect the Tone A followed by a phase reversal in Tone A (the Tone $\overline{A}$), completes sending the current $INFO_{0c}$ sequence, and then transmits the Tone B. Alternatively, if the call MODEM detects the Tone A having correctly received $INFO_{0a}$, the call MODEM conditions itself to detect the phase reversal in Tone A (the tone $\overline{A}$), completes sending the current $INFO_{0c}$ sequence, and transmits Tone B. In either case, the call MODEM then proceeds to the procedure according to (12.2.1.1.3).

(12.2.1.3.2) If, in 12.2.1.1.3, the Tone A phase reversal (the Tone $\overline{A}$) is not detected, the call MODEM continues to transmit the Tone B, waiting for the answer MODEM to transmit another phase reversal (Tone $\overline{A}$).

(12.2.1.3.3) If, in 12.2.1.1.4, the Tone A is not detected within 2700 ms from transmission of the Tone B phase reversal (Tone $\overline{B}$), the call MODEM transmits the Tone B and conditions its receiver to detect the Tone A followed by the phase reversal in Tone A (Tone $\overline{A}$). The call MODEM then proceeds to the procedure in accordance with (12.2.1.1.3).

(12.2.1.3.4) If, in 12.2.1.1.4, the $INFO_h$ is not detected within 2000 ms from the transmission of the Tone B in 12.2.1.1.4, the call MODEM continues to transmit the Tone B and conditions its receiver to detect the Tone A. After detecting the Tone A, the call MODEM proceeds to the procedure in accordance with 12.2.1.1.4.

(12.2.1.4) Answer MODEM recovery mechanism.

(12.2.1.4.1) If, in 12.2.1.2.2 or 12.2.1.2.3, the Tone B is detected before correctly receiving the $INFO_{0c}$, or the repeated $INFO_{0c}$ is received, the answer MODEM repeatedly sends the $INFO_{0a}$. If the answer MODEM receives the $INFO_{0c}$ with bit 28 set to 1, the answer MODEM conditions itself to detect the Tone B, complete sending the current $INFO_{0a}$ sequence, and transmit the Tone A. Alternatively, if the answer MODEM detects the Tone B having correctly received $INFO_{0c}$, the answer MODEM completes sending the current $INFO_{0a}$ sequence, and transmits the Tone A. In either case, the answer MODEM then proceeds to the procedure according to (12.2.1.2.3).

(12.2.1.4.2) If, in 12.2.1.2.4, the Tone B phase reversal (the tone $\overline{B}$) is not detected within 2000 ms from the transmission of the tone $\overline{A}$ in 12.2.1.2.3, the answer MODEM conditions its receiver to detect Tone B. After detecting Tone B, the answer MODEM transmits the Tone A and proceeds to a procedure according to (12.2.1.2.3).

(12.2.1.4.3) If, in 12.2.1.2.6, the Tone B is not detected within 2000 ms from beginning of transmission of the Tone A in 12.2.1.2.5, the answer MODEM sends the $INFO_h$, and then proceeds to Phase 3 of the half-duplex start-up.

(Data Communication Procedure)

Figure 3:
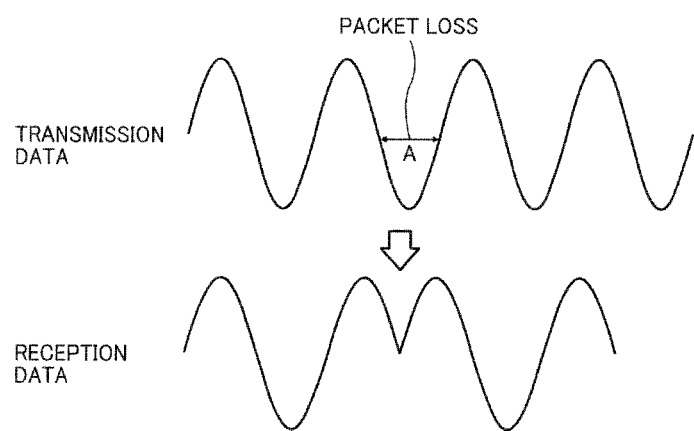
FIG. 3 is a diagram explaining packet loss and absence of reception data.

Next, situations in which the call MODEM and the answer MODEM during the communication procedure shifts to the recovery procedure and the communication procedure is stopped, and a countermeasure to counter these situations are described below. In the communication using an IP network, when packet loss occurs (see gap indicated by arrow A shown in FIG. 3), the reception data may be dropped out. In addition, when the telephone line condition is poor and thus occurring "Phase Hit" (fluctuation in the frequency of the signal in the telephone line), the data may be dropped out.

Herein, in a case in which the pack loss occurs while the answer MODEM transmits the Tone A signal subsequently to the $INFO_{0a}$ sequence signal, the answer MODEM detects the Tone A signal in mistake for the Tone $\overline{A}$ signal. At this time, since the call MODEM receives the Tone A signal subsequently to the $INFO_{0a}$ sequence signal and followed by the Tone $\overline{A}$ signal, the call MODEM proceeds to a state at which the call MODEM transmits the probing signal L2 conforming to the V.34 recommendation. Then, the call MODEM tries to receive the Tone A signal and subsequently to the $INFO_h$ sequence signal, that is, the call MODEM waits to receive the Tone A signal and subsequently to the $INFO_h$ sequence signal.

In addition, since the answer MODEM may not receive the initial $INFO_{0c}$ sequence signal correctly, the call MODEM transmits the $INFO_{0a}$ sequence signal again in accordance with the answer MODEM recovery mechanism specified in (12.2.1.4.1).

Therefore, since the call MODEM cannot receive the $INFO_h$ sequence signal subsequently to the Tone A signal after transmitting the probing signal L2, the call MODEM proceeds to a state at which the call MODEM transmits the Tone B signal in accordance with the answer MODEM recovery mechanism specified in (12.2.1.3.4).

During the recovery procedure, although the answer MODEM transmits the $INFO_{0a}$ sequence signal again and tries to receive the $INFO_{0c}$ sequence signal, the answer MODEM repeats transmitting the $INFO_{0a}$ sequence signal because the $INFO_{0c}$ sequence signal is not transmitted from the call MODEM (during this period, the call MODEM keeps transmitting the Tone B signal).

In addition, the call MODEM tries to transmit the Tone B signal, detect the Tone A signal, and detect the $INFO_h$ sequence signal. However, since the $INFO_h$ sequence signal is not transmitted from the answer MODEM (during this period, the call MODEM keeps transmitting the $INFO_{0a}$ sequence signal again), the call MODEM proceeds to a state in which the call MODEM transmits the Tone B signal in accordance with the answer MODEM recovery mechanism specified in (12.2.1.3.4).

As described above, once the reception data is dropped out, both the call MODEM and the answer MODEM cannot escape from this situation.

However, V.34 recommendation does not disclose how to avoid the above-described situation.

In order to counter these problems, in the MODEM according to the present embodiment is proposed below configuration. When the call MODEM mistakenly recognizes the Tone A signal subsequently to the $INFO_{0a}$ sequence signal from the answer MODEM for the Tone A phase-reversal (Tone $\overline{A}$) or the answer MODEM can not receive the initial $INFO_{0c}$ sequence signal from the call MODEM correctly due to failures such as packet loss, the answer MODEM proceeds to the recovery procedure by resending the $INFO_{0a}$ sequence signal because the answer MODEM cannot receive the $INFO_{0a}$ sequence signal. In this case, the communication procedure in the call MODEM are designed to be return to the first half (in a state in which the $INFO_{0c}$ sequence signal is transmitted) of the Phase 2 when the call MODEM wait to receives the $INFO_{0a}$ sequence signal from the answer MODEM, if the call MODEM cannot receive the $INFO_h$ sequence signal in the recovery procedure.

That is, when the call MODEM receives the $INFO_{0a}$ sequence signal again while the call MODEM tries to receive the $INFO_h$ sequence signal in the recovery procedure, the communication procedure is escaped from the recovery procedure and then is returned to the initial state of the Phase 2, and the call MODEM transmits the $INFO_{0c}$ sequence signal.

With this configuration, due to occurrence of a failure such as packet loss, in a state in which the call MODEM mistakenly recognizes the Tone A signal for the Tone A phase-reversal signal, or the answer MODEM cannot receive the $INFO_{0c}$ sequence signal correctly, the communication procedure shifts to the recovery procedure. During the recovery procedure, even when the call MODEM keeps waiting to receive the $INFO_h$ sequence signal and the answer MODEM keeps waiting to receive the $INFO_{0c}$ sequence signal, the call MODEM can still perform the Phase 2 procedure again from the start. Therefore, accuracy of the recovery procedure is improved, thereby minimizing the possibility of communications being cut off.

Next, the data communication procedure executed by the call MODEM according to the present embodiment is described below with reference to FIG. 4. FIG. 4 is a flowchart illustrating a Phase 2 operation (operation procedure flow) including the recovery procedure in transmission portion of the call MODEM.

Initially, at S101, the transmission portion of the call MODEM transmits the $INFO_{0c}$, and then transmits the Tone B (S102). At this time, when the call MODEM detects only the Tone A, not the $INFO_{0a}$ (Yes at S103), the call MODEM transmits the $INFO_{0c}$ again (S111). After that, the call MODEM determines whether or not the $INFO_{0a}$ (bit 28=1) is received correctly, or the $INFO_{0a}$ and the subsequent Tone A are received (S111). When the $INFO_{0a}$ (bit 28=1) or the $INFO_{0a}$ and the subsequent Tone A are received (Yes at S112), the call MODEM transmits the Tone B (S113).

By contrast, when the call MODEM is a state other than the case in which the call MODEM detects only the Tone A (No at S103), the call MODEM determines whether or not the $INFO_{0a}$ and the subsequent Tone A are detected (S104). When the $INFO_{0a}$ and the subsequent Tone A can be detected (Yes at S104), the detection procedure is executed normally and procedure proceeds to the S105. Alternatively, when the $INFO_{0a}$ and the subsequent Tone A cannot be detected in this order (No at S104), the procedure returns to the step S102, and the call MODEM transmits the Tone B.

Following Yes at S104, the call MODEM determines whether or not the Tone A phase reversal (Tone $\overline{A}$) can be detected, at 5105. When the Tone $\overline{A}$ can be detected (Yes at S105), the call MODEM transmits the Tone B phase-reversal (Tone $\overline{B}$) at S106, followed by the proving signals L1 and L2 at S107.

By contrast, when the Tone $\overline{A}$ cannot be detected (No at S105), the call MODEM transmits the Tone B. Then, the call MODEM determines whether or not another Tone phase reversal (Tone $\overline{A}$) is detected at S114. When the Tone $\overline{A}$ cannot be detected (No at S114), the procedure returns to step S113, and the call MODEM transmits the Tone B. When the Tone $\overline{A}$ can be detected (Yes at S114), the call MODEM transmits the Tone $\overline{B}$ at S106, followed by the proving signals L1 and L2 at S107.

Subsequently, the call MODEM determines whether or not the Tone A is detected at 5108. When the Tone A can be detected (Yes at S108), the call MODEM transmits the Tone B at S109. By contrast, when the Tone A cannot be detected (No at S108), the call MODEM transmits the Tone B at S117 and then determines whether or not the Tone A and the subsequent Tone $\overline{A}$ are detected at S118. When the Tone A and the subsequent Tone $\overline{A}$ can be detected (Yes at S118), the MODEM transmits the Tone $\overline{B}$ at S106. Alternatively, when the Tone A and the subsequent Tone cannot be detected (No at S118), the call MODEM transmits the Tone B at 5113.

Following step S109, the call MODEM determines whether or not the $INFO_h$ is detected at S110. When the $INFO_h$ can be detected (Yes at S110), the procedure proceeds to Phase 3. By contrast, when the $INFO_h$ cannot be detected (No at S110), call MODEM determines whether or not the (re-transmitted) $INFO_{0a}$ is detected at S115. When the $INFO_{0a}$ is detected (Yes at S115), the call MODEM transmits the $INFO_{0c}$ again at S111. Alternatively, when the $INFO_{0a}$ cannot be detected (No at S115), the call MODEM transmits the Tone B again at S116. In these procedures, accuracy of the recovery procedure is improved, thereby minimizing the possibility of communications being cut off.

The operation (data communication method) in the Phase 2 executed by the call MODEM can be executed by a program (data communication program). The data communication can execute the above-described operation procedure by downloading on the Internet, and the installing the program on the communication apparatus.

In addition, in a state in which the data communication program is converted to an executable program in the MODEM and the converted program is stored on the storage medium such as CD-ROM, by attaching the storage medium to the communication apparatus such as facsimile and MODEM, and installing the program on the communication apparatus, the above-described procedure can be executed.

It is to be noted that the above-described embodiment is not limited to thereof, and the MODEM can be modified thin a range. Numerous additional modifications and variations are possible in light of the above teachings. It is therefore to be understood that, within the scope of the appended claims, the disclosure of this patent specification may be practiced otherwise than as specifically described herein.

This patent specification is based on Japanese Patent Application No. 2010-145224 filed on Jun. 25, 2010 in the Japanese Patent Office, the entire contents of which are hereby incorporated by reference herein.

What is claimed is:

1. A communication apparatus for executing half-duplex data communication conforming to V.34 recommendation, transmitting an $INFO_{0c}$, sequence signal, and communicating with an answering communication apparatus that transmits an $INFO_{0a}$, sequence signal, a Tone A signal, a Tone A phase reversal signal, and an $INFO_h$, sequence
the communication apparatus comprising:
a modulation-demodulation device to modulate and demodulate data conforming to V.34 recommendation;
a control device to determine that the communication procedure shift to a recovery procedure by receiving the $INFO_{0a}$ sequence signal transmitted from the answering communication apparatus again in a state in which the communication apparatus mistakenly detects the Tone A signal subsequently to the $INFO_{0a}$ sequence signal for the Tone A phase reversal signal or the answering communication apparatus then cannot receive an initial $INFO_{0c}$ sequence signal transmitted from the communication apparatus correctly, the control device to command the modulation-demodulation device to stop the recovery procedure when the communication apparatus receives the $INFO_{0a}$ sequence signal while waiting to receive the $INFO_h$, sequence signal even without receiving the $INFO_h$ sequence signal from the answering communication apparatus in the recovery procedure; and
a circuit to receive the command from the control device through the modulation-demodulation device, and cause the communication procedure conforming to V.34 recommendation to return to a predetermined state in Phase 2 based on the command from the control device after the recovery procedure is stopped.

2. The communication apparatus according to a claim 1, wherein the control device comprises a central processing unit and associated memory devices that store and execute a program to gauge the state of the communication procedure in the communication apparatus, determine which signal is being received from the answering communication apparatus, and direct when and how the communication procedure should shift.

3. The communication apparatus according to claim 1, wherein the predetermined state to which the communication procedure conforming to V.34 recommendation is returned is an initial period in the Phase 2 during which the communication apparatus transmits the $INFO_{0c}$ sequence signal.

4. The communication apparatus according to a claim 1, wherein the communication apparatus comprises a call MODEM, and the answering communication apparatus comprises an answer MODEM.

5. A control method for executing half-duplex data communication conforming to V.34 recommendation in a communication apparatus, the communication apparatus transmitting an $INFO_{0c}$ sequence signal and communicating with an answering communication apparatus that transmits an $INFO_{0a}$ sequence signal, a Tone A signal, a Tone A phase-reversal signal, and an $INFO_h$ sequence signal,
the control method comprising the steps of:
when the communication apparatus mistakenly detects the Tone A signal subsequently to the $INFO_{0a}$ sequence signal for the Tone A phase-reversal signal and the answering communication apparatus then cannot receive an initial $INFO_{0c}$ sequence signal transmitted from the communication apparatus correctly, determining that the communication procedure shifts to a recovery procedure by receiving the $INFO_{0a}$ sequence signal transmitted from the answering communication apparatus;
stopping the recovery procedure when the communication apparatus receives the $INFO_{0a}$ sequence signal while waiting to receive the $INFO_h$ sequence signal even without receiving the $INFO_h$ sequence signal from the answering communication apparatus in the recovery procedure; and
returning the communication procedure conforming to V.34 recommendation to a predetermined state in Phase 2.

6. The control method for executing half-duplex data communication according to claim 5, wherein the predetermined state to which the communication procedure conforming to V.34 recommendation is returned is initial period in the Phase 2 during which the communication apparatus transmits the $INFO_{0c}$ sequence signal.

7. A non-transitory computer readable medium storing a program for executing a control method that causes a communication apparatus to execute half-duplex data communication conforming to a V.34 recommendation, the communication apparatus capable of transmitting an $INFO_{0c}$ sequence signal and communicating with an answering communication apparatus that transmits an $INFO_{0a}$ sequence signal, a Tone A signal, a Tone A phase-reversal signal, and an $INFO_h$ sequence signal,
the control method comprising the steps of:
determining that the communication procedure shifts to a recovery procedure by receiving the $INFO_{0a}$ sequence signal transmitted from the answering communication apparatus in a state in which the communication apparatus mistakenly detects the Tone A signal subsequently to the $INFO_{0a}$ sequence signal for the Tone A phase-reversal signal and the answering communication apparatus then cannot receive an initial $INFO_{0c}$ sequence signal transmitted from the communication apparatus correctly;

stopping the recovery procedure when the communication apparatus receives the $INFO_{0a}$ sequence signal while waiting to receive the $INFO_h$ sequence signal even without receiving the $INFO_{0a}$ sequence signal from the answering communication apparatus in the recovery procedure; and returning the communication procedure conforming to V.34 recommendation to a predetermined state in Phase 2.

8. The non-transitory computer readable medium according to claim 7, wherein the predetermined state to which the communication procedure conforming to V.34 recommendation is returned is initial period in Phase 2 during which the communication apparatus transmits the $INFO_{0c}$ sequence signal.

\* \* \* \* \*